United States Patent Office 3,457,108
Patented July 22, 1969

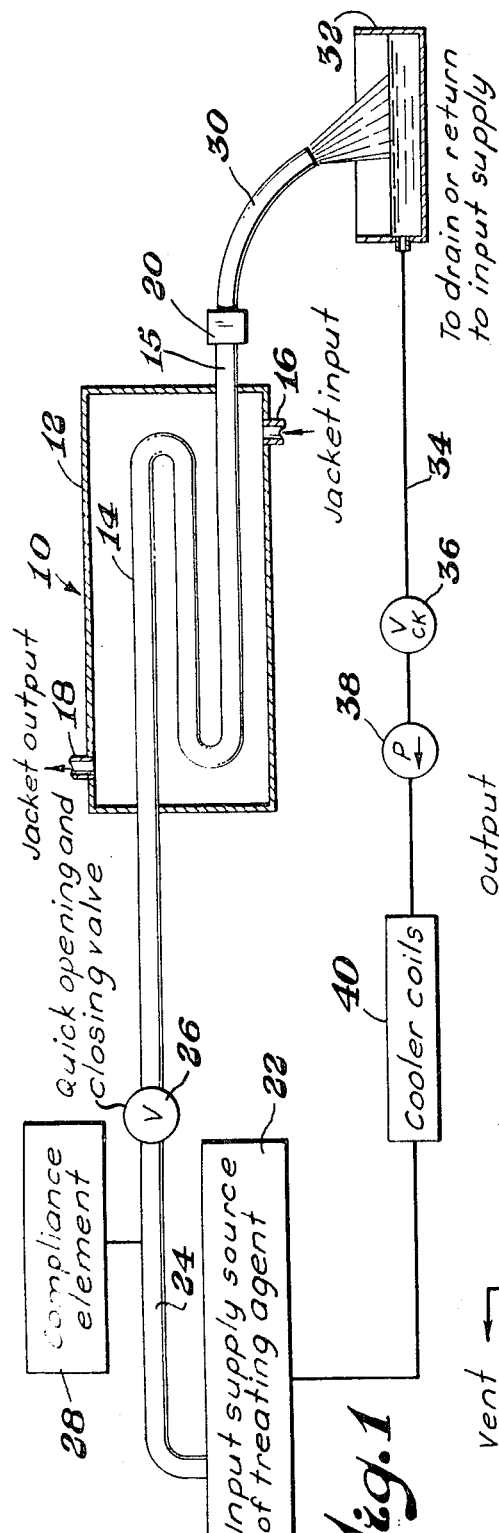

3,457,108
METHOD OF REMOVING ADHERENT MATERIALS
George T. Hittel, Midland, Mich., assignor to The Dow Chemical Company, Midland, Mich., a corporation of Delaware
Filed Aug. 3, 1964, Ser. No. 387,040
Int. Cl. B08b 3/10, 3/08; C23g 1/00
U.S. Cl. 134—22                                                7 Claims

ABSTRACT OF THE DISCLOSURE

Method of removing adhering materials from a surface part of a vessel, such as deposits from tube walls of closed vessels, by urging liquid treating agent into or through the vessel while subjecting the treating agent to cyclic stress to induce cavitations at a repetition rate of between one time per minute and five hundred times per minute. The treating agent may include various chemical cleaning agents, usually in quite dilute solutions.

---

This invention relates to a method of cleaning adhering materials from a surface part of a vessel, and particularly to a method of removing deposits from tube walls of closed vessels.

One method of removing adhering materials from the walls or other surfaces of vessels has been the "fill and soak" method. The vessel (or tubes) to be cleaned are pumped full of the treating liquid and then soaked for a predetermined time while the treating liquid loosens or dissolves the adhering material.

Alternatively, the treating liquid is continuously flowed through the vessel or tubes to achieve the above stated desired result.

Unfortunately, not all adhering materials respond to either the "fill and soak" or "flow through" cleaning methods. Plugged tubes, particularly are often impossible to clean by these methods. Further, the chemicals used in practicing these cleaning methods sometimes damage the vessels or tubes being cleaned.

Another disadvantage is the "down time" required to clean vessels or tubes by these methods.

A further disadvantage is the high cost of the chemicals used in the treating liquid.

Accordingly, a principal object of this invention is to provide an improved method of removing adhering materials from a surface of a vessel.

Another object of this invention is to provide an improved, faster method of removing adhering materials from a surface of a vessel.

A further object of this invention is to provide an improved, safer method of removing adhering materials from a surface of a vessel.

Yet another object of this invention is to provide an improved method of removing adhering materials from a surface of a vessel which required little or no nonproductive use of the vessel while the removal of materials takes place.

A still further object of this invention is to provide an improved, or stream method of removing adhering materials from surfaces of tubes and the like.

In accordance with this invention, materials adhering to surfaces of vessels (including tubular vessels) are removed by urging liquid treating agent into or through said vessel while subjecting said treating agent to cyclic stress at a repetition rate of between one and five hundred times per minute.

The treating agent may be water plus solvent, an organic solvent, acid solution, or alkali solution, for example.

This invention, as well as additional objects and advantages thereof, will best be understood when the following detailed description is read in connection with the accompanying drawing, in which:

FIGURE 1 is a diagrammatical view of one apparatus which is suitable for carrying out the present invention;

FIGURE 2 is a diagrammatical view of alternative apparatus which is suitable for use in practicing the present invention, and FIGURE 3 is a diagrammatical view showing apparatus suitable for use in practicing this invention in connection with a jacketed vessel.

Referring to FIGURE 1, there is shown a vessel 10, such as a heat exchanger, for example, having an outer housing or jacket 12 and at least one tube 14 which extends into and through the jacket 12.

The jacket 12 has an input line 16 and output line 18 whereby fluid may be circulated, for example.

The part 15 of the tube 14 which extends from the jacket is connected through the coupling 20 to a hose 30 which is at least several feet in length.

An input supply source 22 of treating agent, under pressure (by means of a pump, not shown, for example) is coupled to the tube 14 through a pipe 24 and a quick opening and closing valve 26. A compliance element 28, such as an expansion tank, for example, is coupled to the pipe 24 between the valve 26 and the treating agent source 22.

The output end of the hose 30 (which should have walls which do not collapse in this type of service) is directed towards a pan-like vessel 32 which is adapted to receive treating agent and loosened materials removed from the tube 14. The material deposited in the vessel 32 may be fed to a drain (not shown) or returned to the input supply source 22 of treating agent through a line 34, check valve 36, pump 38 and cooler coils 40.

In operation, treating agent from the source 22, under pressure, is urged under pressure through the line 24 and the tube 14 of the vessel 10. The quick opening and closing valve 26 is actuated at a sonic rate, 30 cycles per minute, for example, with the result that the testing agent in the tube 14 is placed in tension at a cyclic rate.

Usually, a heated liquid is pumped through the jacket 12 while the treating agent is urged through the tube 14. It is desirable, if best cleaning or removing of adherent materials is to be achieved, that the liquid circulating through the jacket 12 heat the walls of the tube to a temperature such that boiling at the inner wall surface of the tube occurs when the treating agent is placed under tension. This boiling at the surface tends to dislodge adherent materials more rapidly than when cyclic stress alone is used.

The rate at which the quick opening and closing valve 26 is actuated and the flow rate of treating agent may be varied to control the amount of cyclic stress imposed on the treating agent in the tube 14.

The treating agent which is used varies with the type of adherent materials which are to be removed. The following examples are illustrative of cleaning operations in accordance with this invention.

Example I

A series of condenser tubes (1 inch outer diameter, .120 inch wall thickness) fouled with a calcareous and ferritic scale were taken from service, cut into 8" lengths and subjected to cyclic stress at 2 cycles per second for a half hour using an aqueous inhibited ½ percent hydrochloric acid solution as the treating agent. At the end of the test the inner walls of the tube was completely clean, pit free, and scale free, with the appearance of new pipe which has been pickled to remove mill scale.

Similar lengths of condenser tubes were subjected to cyclic stress with water as the treating agent at a rate of 2 cycles per second for ½ hour, with very little effect on the fouled surface.

When a similar length of tubing had a ½ percent inhibited hydrochloric acid solution pumped through it at high velocity, the inner wall had some scale streaks and linear pitting. The wall was not clean, having at least 15 percent of the circumference covered with ferritic scale up to .020 inch thick.

Soaking a similar length of tubing in a ½ percent inhibited solution of hydrochloric acid for a half hour at 60 degrees centigrade resulted in only about ⅓ of the calcareous scale being removed and essentially none of the ferritic scale removed.

Thus, the combination of cyclic stress and chemical cleaning with a very dilute acid solution gave excellent results as compared with the cycle stress or chemical treatment (high velocity flow or soaking) alone.

Example II

A series of small copper heat exchangers (sheet and tube) used to transfer heat in No. 300 neutral oil inhibited with zinc thiophosphate became fouled to the extent of completely filling the shell side with a tarry asphaltic mass of organic pyrolysis products.

Using perchloroethylene as the treating agent, with steam in the tubes and cyclic stress applied at 2 cycles per second, the shell side of the tubes were completely clean in 15 minutes.

When similarly fouled tubes were soaked in perchloroethylene for one week the solvent darkened, but the tubes remained plugged.

The use of a 3 percent inhibited hydrochloric acid solution plus cyclic stress for one hour didn't appreciably change the condition of the plugged tube. A 3 percent caustic soda solution treating agent, used in conjunction with cyclic stress, also made little change in the plugged pipes. The solution was darkened, but the pipes were still plugged.

Example III

Sections of a 1 inch outer diameter 18 gauge titanium tube were removed from a fouled heat exchanger. The fouling consisted of a hard, dark scale. Conveniently sized lengths of tube were cut and installed in a test device to allow circulation of fluid, cyclic stress, and thermal measurement to be made. When a 20 percent alkylene polyamine polyacetic acid and water solution and jacket steam (10 p.s.i.g.) was used with cyclic stress at 2 cycles per second for one hour, the measured 1/U value was .00166 as compared with .00252 for the uncleaned tubing. When a piece of the tubing was cleaned with 180 grit emery paper to yield a clean surface, the 1/U value was .00162. The use of water with cyclic stress alone (at room temperature) with 10 lb. steam, and with 150 lb. steam for 1 hour each resulted in a 1/U value of .00218.

From the above, it is seen that the use of cyclic stress plus a chelating agent and water solution gives a cleaning result almost equal to that obtained with mechanically cleaned tubing.

Example IV

The following example of the cleaning of a cracker unit in a chemical plant indicates the value of cyclic stress in acid cleaning. The water used in heat transfer is recycled through a cooling tower and runs at about 2200 p.p.m. mineral content so that fouling is serious.

Nov. 1, 1963.—Conventional fill and soak acid cleaning using 6% inhibited HCl:

Flow before cleaning _____ g.p.m__ 800
Flow after cleaning _____ g.p.m__ 1075
Product temperature before cleaning __° C__ 55
Product temperature after cleaning __° C__ 36
Vent temperature before cleaning ____° C__ 94
Vent temperature after cleaning _____° C__ 45

Feb. 1, 1964.—Conventional fill and soak acid cleaning using 6% inhibited HCl:

Flow before cleaning _____ g.p.m__ 825
Flow after cleaning _____ g.p.m__ 850
Product temperature before cleaning ___° C__ 48
Product temperature after cleaning ____° C__ 41
Vent temperature before cleaning _____° C__ 95
Vent temperature after cleaning _____° C__ 65

April 10, 1964.—Cleaned "on the fly" while the cracker is in operation using cyclic stress and 3% inhibited HCl:

Flow before cleaning _____ g.p.m__ 700
Flow after cleaning _____ g.p.m__ 1140
Product temperature before cleaning __° C__ 53
Product temperature after cleaning ___° C__ 35
Vent temperature before cleaning ____° C__ 95
Vent temperature after cleaning _____° C__ 35

From the above data, it is obvious that a better job (as determined by flow and vent temperature) was obtained Apr. 10, 1964, on a worse condition than had been obtained previously by conventional methods.

A further advantage is found in the fact that this operation was done "on the fly" with the plant in operation rather than shut down, which is necessary in conventional cleaning.

When the cost or the amount of the treating agent used is substantial, recirculation of the treating agent is often indicated. Because the treating agent is often quite hot as it leaves the vessel being treated, it is usually passed through the cooler coils 40 before being pumped into the supply source 22. The check valve 36 in the line 34 prevents back flow from the supply source 22 when the pump 38 is not in operation.

Referring now to FIGURE 2, a by pass line 42 is shown coupled between the input line 24 and the output line 30a which are in turn coupled to the vessel 10. The coupling of the by pass line 42 to the line 24 is between the quick opening and closing valve 26 and the vessel 10. A valve 50 is disposed along the line 42.

The arrangement shown in FIGURE 2 is especially beneficial in cleaning vessels in which the tube or tubes 14 are more or less completely plugged. Apparently, when the tubes 14 are plugged, a double ended action on the tubes takes place which permits much more rapid cleaning than if conventional fill and soak cleaning methods are used. As the treating proceeds, the valve 50 is closed progressively until it appears that flow from the line 30 is being restricted. The reason for progressively closing the valve 50 is that once the tube 14 becomes slightly un-plugged, better cleaning occurs if greater flow-through the tube 14 may be achieved.

The by pass line 42 is also helpful and a good safety precaution to use when cleaning vessels where the physical condition of the vessel or its associated piping and hardware is no completely known. In such circumstances the full by pass flow is used at tht start of the treatment and then lessened as it is found that the vessel being treated is withstanding the cyclic stress without undue strain.

FIGURE 3 shows a jacketed reactor kettle adapted to have its jacket walls cleaned in accordance with this invention. The vessel 52 comprises an inner wall 54, outer wall (jacket) 56, cover 58 and gasket 60 disposed between the cover and the outwardly extending flange 61. The cover 58 is secured to the vessel by means of bolts 62. A vent having a valve 64 extends through the cover 58.

A filling and discharge line 65 extends from the bottom of the inner wall 54 to a kettle drain (or fill) line. A valve 66 is disposed along the line 65. A pair of input lines 72, 74 having valve 68, 70 respectively therein, are coupled between the outer wall or jacket 56 and the input line 76 from the tension member (as though the line 76 was connected on the downstream side of the quick opening and closing valve 26 shown in FIGURE 1), for example.

An output line 78 is coupled through the upper part of the outer wall or jacket 56. A valve 80 is coupled along the line 78.

In operation, the treating agent to be used in cleaning the outer surface of the wall 54 and the inner surface of the wall 56 enters the jacket of the vessel through the inlet pipes 72, 74 from the line 76, and leaves through the output line 78 (valve 80 open). The treating agent may be any of the chemical treating agents which are conventionally used in removing the particular type of material which adheres to the wall surfaces, and the cyclic rate of placing the treating agent in the jacket under tension may be between 1 and 500 cycles per minute.

While commonly a uniform cyclic rate is maintained in placing the treating agent under tension, the rate need not be uniform or cyclic. Placing the treating agent under tension at random intervals is also practical in connection with the practice of this invention.

Treating agents commonly used in connection with invention for removing organic deposits include: chlorinated solvents, aliphatic and aromatic hydrocarbons, emulsions of aliphatic or aromatic hydrocarbons and alkalis or acids (either mineral or organic). Wetting agents and/or detergents are commonly added to treating agents.

For inorganic deposits, the treating agent may be mineral acid, inorganic acids, organic acid, or combinations of acid. Hydrochloric acid is the principal acid, although sulfuric, chromic, phosphoric and sulfonic acid are often used. Formic, citric and acetic acids or mixtures thereof are also used, for example.

Additives to acid such as ammonium bi-fluoride in one form or another are used when silicates are a constituent of inorganic deposits. Chelating agents are also used as treating agents in removing inorganic deposits.

If a mineral deposit and an oily non-mineral deposit are both present, a combination of treating agents may be used. For example, to remove the oily deposit an alkalene detergent degreasing treatment may be used followed by a mineral acid stage. If the deposits of the organic constituent are non-oily, then it may be necessary to use an oxidizing treating agent solution or concentrated sulfuric acid followed by mineral acid treating agent such as inhibited hydrochloric acid.

Fluoro-carbons or fluorochloro-carbon compounds are used in treating agents for cleaning missile components, for example.

While the invention has been described in connection with cleaning heat exchangers, missile components and reaction vessels, bubble towers and vessels of various sizes and shape may be cleaned in accordance with this invention.

Other materials than those listed herein may be used as treating agents. In general, those treating agents which are used in fill and soak type chemical cleaning may be used, although in reduced strength. Because this invention gives excellent results in less time with less concentrated chemical solutions, the invention is advantageous economically in at least three respects: (1) down time (if at all) is less than when fill and soak cleaning is done, (2) less cost for the treating agent used (less concentrated material used), and (3) less (or no) adverse effect of treating agent on the vessel or material being cleaned.

While a repetition rate for inducing tension in the treating agent of from 1 to 500 times per minute is practicable, a repetition rate of from one-half to 3 cycles per second is commonly used.

The cavitation produced substantially throughout the vessel to which treating agent is applied is easily achieved by means of the quick opening and closing valve 26. The valve 26 may either externally actuated or operate more or less synchronously depending on the pressure applied to the treating agent.

The input supply source 22, though shown in block diagram form, may be composed of a reservoir and a pump coupled thereto to provide the treating agent demand at operating pressure.

What is claimed is:
1. A method of removing materials adhering to a surface in a vessel having an inlet and an outlet, comprising:
  (a) essentially filling said vessel by flowing thereinto through said inlet a liquid base treating agent, exclusive of an agent consisting of water, which is chemically active with respect to said adhering materials;
  (b) continuing to flow said liquid base treating agent under pressure into said essentially filled vessel through said inlet while said outlet remains open;
  (c) inducing cavitation substantially throughout said treating agent in said vessel, in the form of a partial vacuum, by suddenly closing and then opening said inlet at a rate of between 1 and 500 times per minute while said treating agent is being flowed through said vessel, to thereby chemically and physically loosen said adhering materials, said loosened materials being carried from said surface as said treating agent flows through said vessel and through said outlet.

2. A method in accordance with claim 1 wherein the vessel is substantially completely plugged with said adhering materials, further including an initial step prior to said filling step comprising flowing said treating agent through said inlet and bypassing at least initially substantially all of said treating agent to said outlet while suddenly closing and then opening said inlet at a rate of between 1 and 500 times per minute until there is some direct flow through said vessel between said inlet and said outlet, and then decreasing said bypass flow of treating agent as the flow through said vessel increases.

3. A method in accordance with claim 1, wherein said treating agent comprises an aqueous acid solution.

4. A method in accordance with claim 1, wherein said treating agent is an organic solvent.

5. A method in accordance with claim 1, wherein said treating agent is an alkali solution.

6. A method in accordance with claim 1, wherein said treating agent is an emulsion.

7. A method in accordance with claim 1, wherein rate of inducing cavitation is between ½ and 3 cycles per second.

References Cited
UNITED STATES PATENTS

| | | | |
|---|---|---|---|
| 1,049,054 | 12/1912 | Coombs. | |
| 1,582,974 | 5/1926 | Garbarino | 134—22 |
| 1,628,530 | 5/1927 | Burnett | 134—22 |
| 1,840,834 | 1/1932 | Davis | 165—84 |
| 2,089,317 | 8/1937 | Wilder | 134—22 XR |
| 2,123,434 | 7/1938 | Paulson et al. | 134—22 |
| 2,482,904 | 9/1949 | Dougherty et al. | 134—22 |
| 2,514,797 | 7/1950 | Robinson | 165—84 XR |
| 2,540,395 | 2/1951 | Ifield | 137—568 XR |
| 2,664,274 | 12/1953 | Worn et al. | 165—84 XR |
| 2,894,861 | 7/1959 | Solver et al. | 134—22 |

MORRIS O. WOLK, Primary Examiner

J. T. ZATARGH, Assistant Examiner

U.S. Cl. X.R.

134—1, 17